June 24, 1924.
J. F. COWDEN
1,499,053
DOOR OPERATING MECHANISM FOR GARAGES
Filed Dec. 15, 1921  2 Sheets-Sheet 1
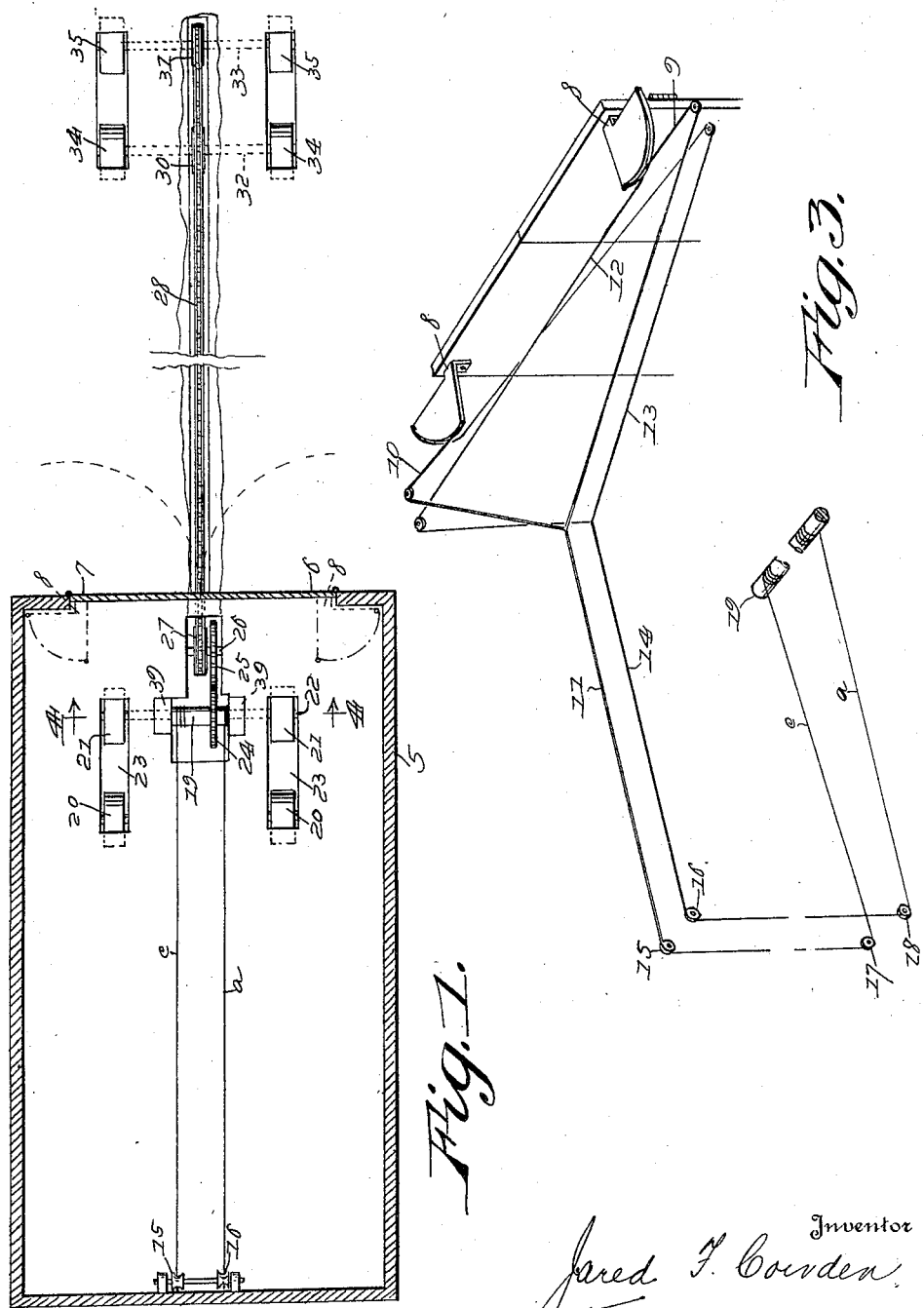
Inventor
Jared F. Cowden
By
Attorney

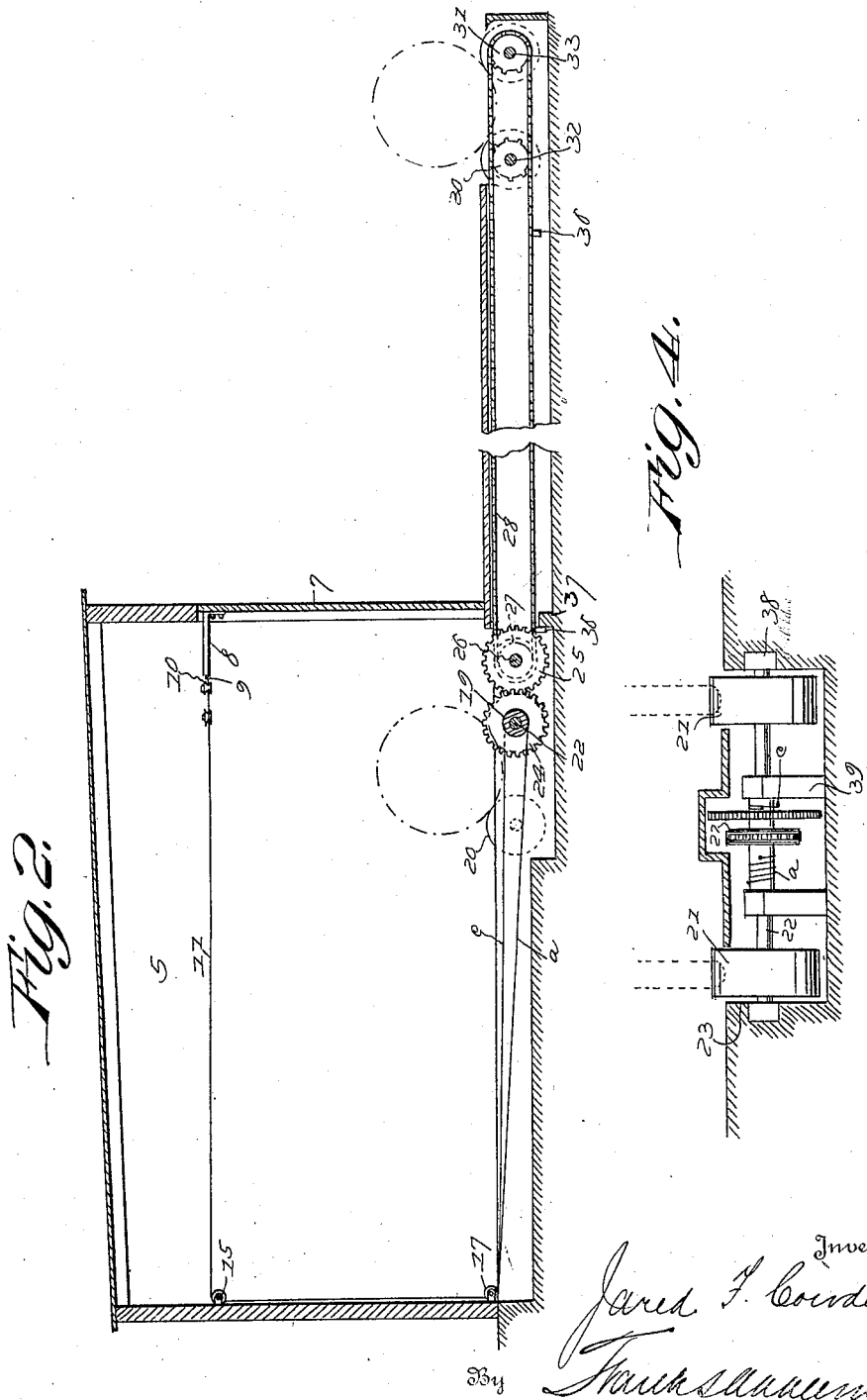

Patented June 24, 1924.

1,499,053

UNITED STATES PATENT OFFICE.

JARED F. COWDEN, OF SALEM, OREGON.

DOOR-OPERATING MECHANISM FOR GARAGES.

Application filed December 15, 1921. Serial No. 522,625.

*To all whom it may concern:*

Be it known that I, JARED F. COWDEN, a citizen of the United States of America, and resident of Salem, in the county of Marion and State of Oregon, have invented certain new and useful Improvements in Door-Operating Mechanism for Garages, of which the following is a specification.

This invention relates to mechanically operated doors, and particularly to a device intended for mechanically operating garage doors in which the power of an automobile is relied on for imparting motion to the power operated parts of the device.

An object of this invention is to provide novel means whereby the traction wheels of an automobile will operate the door actuating mechanism and open or close said doors, according to the position of the automobile with respect to the doors, it being the purpose of the inventor to provide means which will prevent the approach of the automobile to a dangerous position with respect to the doors prior to the time the said doors are open; and it is furthermore an object of this invention to provide novel means whereby the automobile serves to lock the doors in closed position and maintain them closed until the traction wheels of the automobile are driven.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a plan view of the door operating mechanism embodying the invention, the structure and the door being in section;

Figure 2 illustrates a vertical sectional view of the same;

Figure 3 illustrates a perspective view of a door and its actuating means; and

Figure 4 illustrates a sectional view on a line corresponding with the line 4—4 of Fig. 1.

While this invention is capable of mechanical embodiments differing somewhat in detail and arrangement, the embodiment of the invention shown will, it is thought, enable those skilled in the art to practice the invention, it being understood that it is the purpose of the inventor to be unrestricted with respect to the details and arrangements, so far as they may fall within the scope of the claim. The guarded structure or enclosure 5 has, in this embodiment of the invention, double doors, 6 and 7, each of which has a bracket 8 at the hinged edge thereof, the said bracket being segmental in plan.

In order to communicate the power from the operating mechanism to the doors, the brackets are provided with flexible members 9 and 10 forming branches of a cable 11, and flexible members 12 and 13 connected to a cable 14. The flexible members 9 and 10 are attached to the segmental brackets at what might be termed the "inner edges" of the said brackets, whereas the flexible members 12 and 13 are attached to the brackets at their outer edges, but these flexible members are intended to operate in a recess or groove in the periphery or curved edges of the said brackets, in order that when a pull is exerted on the cables 11 or 14, the doors will be closed or opened. The cables 11 and 14 operate over sheaves or idlers 15 and 16 respectively, and other idlers 17 and 18, and are then wound on a drum or shaft 19, the winding of the cable 11 being opposite to that in which the cable 14 is wound on the drum. The terms "cable" and "flexible member" have been employed as descriptive of the elements, but it is to be understood that any rope, wire or cable, or an equivalent thereof can be employed as a means for effecting the operation of the doors through the means just described. Within the guarded structure are pairs of wheels, in such spaced relation to each other as to be engaged by the traction wheels of an automobile which has entered the structure. The wheel 20 of each pair is rotatably mounted as an idler, whereas the wheel 21 of each pair is mounted on a shaft 22 which may be journaled in suitable bearings in any appropriate way, and the peripheries of the wheels 20 and 21 are exposed through openings 23 in the floor of the guarded structure, or the wheels may be so mounted as to support the traction wheels of an automobile, as practice may dictate. The shaft 22 has the drum 19 mounted on it and the drum has a gear wheel 24 meshing with a gear wheel 25 on a shaft 26 which is rotatably mounted in suitable bearings. A driven wheel 27, here shown as a sprocket wheel, is secured to the shaft 26, and it is engaged by a driving element 28, here shown as a sprocket chain, which sprocket chain operates over sprocket wheels 30 and 31 on the shafts 32 and 33 respectively and these shafts are journaled in an appropriate way at a point remote from the entrance to the structure and in such relation thereto as to permit the doors to swing clear of an automobile which might be supported on the wheel rollers 34 and 35 of the shafts 32 and 33 respectively.

The element 28 has stop lugs or devices 36 in such relation to each other on the said element as to engage an abutment or shoulder 37 when the doors are fully opened or closed, and the relation of parts is such that when the doors are open, the stop lugs will serve to hold the rollers, on which the traction wheels of the automobile are resting, against movement in order that the traction wheels may have sufficient traction to permit it to be displaced from these supporting rollers.

Having in mind the construction and functions of the elements as ascribed to them, it is believed apparent that should an automobile approach the doors of the structure when the said doors are in a closed position, the traction wheels of the automobile on coming in engagement with the wheel rollers 34 and 35 will serve to rotate the shafts 32 and 33 providing, of course, the motor of the automobile is kept running, and this will result in communicating motion to the drum through the gearing heretofore described, which action will result in winding one of the cables and unwinding the other cable with respect to the drum, and since the winding of the cable 14 on the drum will result in opening the doors of the guarded structure, the automobile will be without traction to enable it to leave the wheel rollers 34 and 35 until the said doors are open and the stop lugs have encountered a resistance which will prevent further rotation of the said wheel rollers. At this time the doors are open and the automobile may enter the structure. If an automobile should approach the structure when the doors are closed, it would not pass beyond the rollers 34 and 35 if they are properly set, since the driven wheels would be without traction and hence a careless operator could not injure the guarded structure or the doors thereof, since he could not drive beyond the wheel rollers 34 and 35, unless the doors were open. After the automobile has opened the doors, therefore, and passed within the structure, the traction wheels of the automobile encounter the pairs of rollers 20 and 21 and the continued operation of the traction wheels would result in closing the doors through the winding of the cable 11 and unwinding of the cable 14, and when the doors are closed, they will be held against being opened by the weight of the automobile on the rollers 20 and 21, so that after the doors are closed, they become locked and cannot be opened except through the operation of the automobile.

The shafts may be supplied with suitable bearings, as stated, and as illustrating a mode of installing such bearings, the bearing blocks 38 may be imbedded in the floor structure, whereas bearing brackets such as 39 may also be supplied, but these are details of construction which need not be seriously considered, since one skilled in the art could understand their installation.

I claim:

In a door operating mechanism for garages, a bracket secured to a door, flexible elements connected to opposite edges of the bracket, a drum on which the flexible elements are wound oppositely, a pair of parallel wheel rollers on one side of the door which are adapted to be engaged by the traction wheel of an automobile for driving the same, a flexible member including means for communicating the rotary motion of the wheel rollers to the said drum, and an abutment carried by the said flexible member adapted to strike a stationary object for arresting the rotary motion of the wheel roller when the drum has been driven a predetermined degree.

JARED F. COWDEN.